(12) United States Patent
Tsuboi et al.

(10) Patent No.: US 7,546,310 B2
(45) Date of Patent: Jun. 9, 2009

(54) EXPRESSION DETECTING SYSTEM, AN EXPRESSION DETECTING METHOD AND A PROGRAM

(75) Inventors: Yuta Tsuboi, Yamato (JP); Hiroshi Kanayama, Yokohama (JP); Tetsuya Nasukawa, Fujisawa (JP); Hideo Watanabe, Machida (JP)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 11/273,924

(22) Filed: Nov. 14, 2005

(65) Prior Publication Data

US 2006/0112134 A1 May 25, 2006

(30) Foreign Application Priority Data

Nov. 19, 2004 (JP) .............................. 2004-335906

(51) Int. Cl.
*G06F 7/00* (2006.01)
(52) U.S. Cl. .................................... 707/102; 707/104.1
(58) Field of Classification Search ...................... 707/2, 707/5, 100, 101, 102, 104.1; 709/217; 704/10
See application file for complete search history.

(56) References Cited

U.S. PATENT DOCUMENTS

| 5,761,666 | A | * | 6/1998 | Sakai et al. | ................. | 707/100 |
| 5,768,580 | A | * | 6/1998 | Wical | ........................ | 707/102 |
| 7,143,089 | B2 | * | 11/2006 | Petras et al. | ................... | 707/5 |
| 7,185,065 | B1 | * | 2/2007 | Holtzman et al. | ........... | 709/217 |
| 2002/0062368 | A1 | * | 5/2002 | Holtzman et al. | ........... | 709/224 |
| 2003/0101166 | A1 | * | 5/2003 | Uchino et al. | .................. | 707/2 |

(Continued)

FOREIGN PATENT DOCUMENTS

JP 2000-293526 10/2000

(Continued)

OTHER PUBLICATIONS

Salvetti et al., Impact of Lexical Filtering on Overall Opinion Polarity Identification, American Association for Artificial Intelligence, Spring Symposia, Mar. 22-24, 2004, 5 pages + cover sheet.*

(Continued)

*Primary Examiner*—Pierre M. Vital
*Assistant Examiner*—Edward J Kennedy
(74) *Attorney, Agent, or Firm*—Richard M. Goldman; Shimokaji & Associates, P.C.

(57) ABSTRACT

A system and method for detecting preference expressions indicating evaluators' likes and dislikes of a product from evaluations of the product and stores text describing evaluation of the product in association with an attribute of the text. The method extracts an evaluating expression describing evaluation of the specific object from each of the texts, determines whether the extracted evaluating expression has positive or negative polarity, where the positive indicates favorable evaluation and the negative indicates unfavorable evaluation. The system inputs a text attribute that is designated as an object for detecting the preference expression and detects an evaluating expression, which is detected from a text having an input attribute from the extracted evaluating expressions as one of the preference expressions and outputs the preference expressions in association with a frequency of the preference expressions being determined to have the positive or negative polarity in the text having the attribute.

9 Claims, 12 Drawing Sheets

U.S. PATENT DOCUMENTS

| | | | |
|---|---|---|---|
| 2005/0091038 A1* | 4/2005 | Yi et al. | 704/10 |
| 2005/0187932 A1* | 8/2005 | Kanayama et al. | 707/6 |
| 2006/0069589 A1* | 3/2006 | Nigam et al. | 705/1 |

FOREIGN PATENT DOCUMENTS

| | | |
|---|---|---|
| JP | 2002-140465 | 5/2002 |
| JP | 2003-203136 | 9/2002 |
| JP | 2002-297626 | 10/2002 |
| JP | 2003-017430 | 5/2003 |

OTHER PUBLICATIONS

Kenji Tateishi, Yoshihide Ishiguro and Toshikazu Fukushima, Opinion Information Retrieval from the Internet, Internet Systems Research Laboratories, NEC Corp., dated Jul. 16, 2001, vol. 2001, No. 69, ISSN 0919-6072, Japan.

Manabu Okumura, Tomoyuki Nanno, Toshiaki Fujiki and Tasuhiro Suzuki, Automatically Collecting, Monitoring and Mining Japanese Weblogs, Precision and Intelligence Laboratory, Tokyo Institute of Technology, dated Jan. 21, 2000, SIG-SW&ONT-A401-01, Japan.

Shigeru Fujimura, Masashi Toyoda and Masaru Kitsuregawa, A Consideration of Extracting Reputations and Evaluative Expressions from the Web, Graduate School of Information Science and Technology, The University of Tokyo; Institute of Industrial Science, The University of Tokyo, IPSJ SIG Technical Report, dated Jul. 14, 2004, vol. 2004, No. 72, ISSN 0919-6072, Japan.

Tetsuya Nasukawa and Hiroshi Kamayama, Acquisition of Sentiment Lexicon by Using Context Coherence, IBM Research, Tokyo Research Laboratory, IPSJ SIG Technical Report, dated Jul. 16, 2004, vol. 2004, No. 73, ISSN 0919-6072, Japan.

* cited by examiner

[Figure 1]
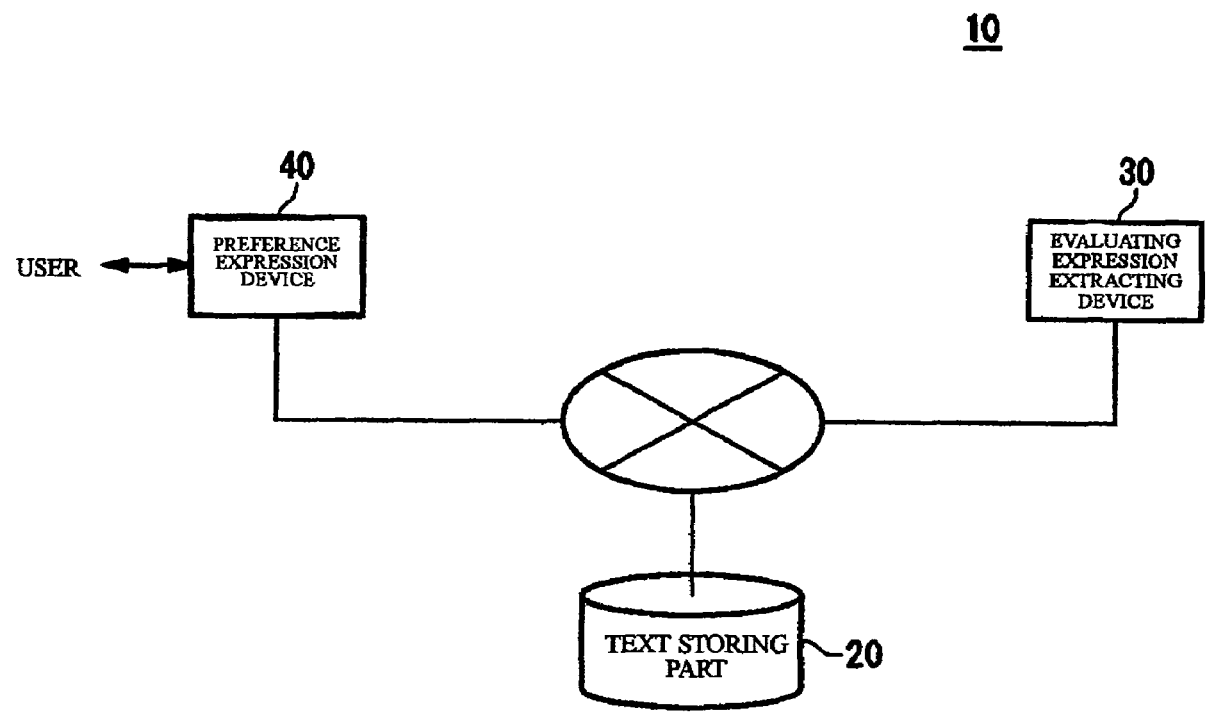

[Figure 2]

| STATEMENT NUMBER | GENRE | ATTRIBUTE | | | | TEXT |
|---|---|---|---|---|---|---|
| | | AGE GROUP | SEX | DATE AND TIME | REGION | |
| 1 | BEER | 20s | MALE | 2004/9/10 | KANAGAWA PREFECTURE | AA beer is bitter and I like it. |
| 2 | BEER | 30s | MALE | 2004/9/10 | TOKYO | I don't like BB beer. It's thin. |
| 3 | BEER | 40s | FEMALE | 2004/9/10 | KANAGAWA PREFECTURE | I like CC beer for its low calorie. |
| 4 | CALL CENTER | 30s | MALE | 2004/4/5 | OSAKA | The service is very good. The problem is solved. |
| 5 | CALL CENTER | 20s | FEMALE | 2004/5/20 | TOKYO | Hard to get through. The service is poor. |
| 6 | CALL CENTER | 40s | MALE | 2004/6/5 | TOKYO | The person answered to my call did a good job and I satisfied with it, but... |
| …… | …… | …… | …… | …… | …… | …… |

[Figure 3]
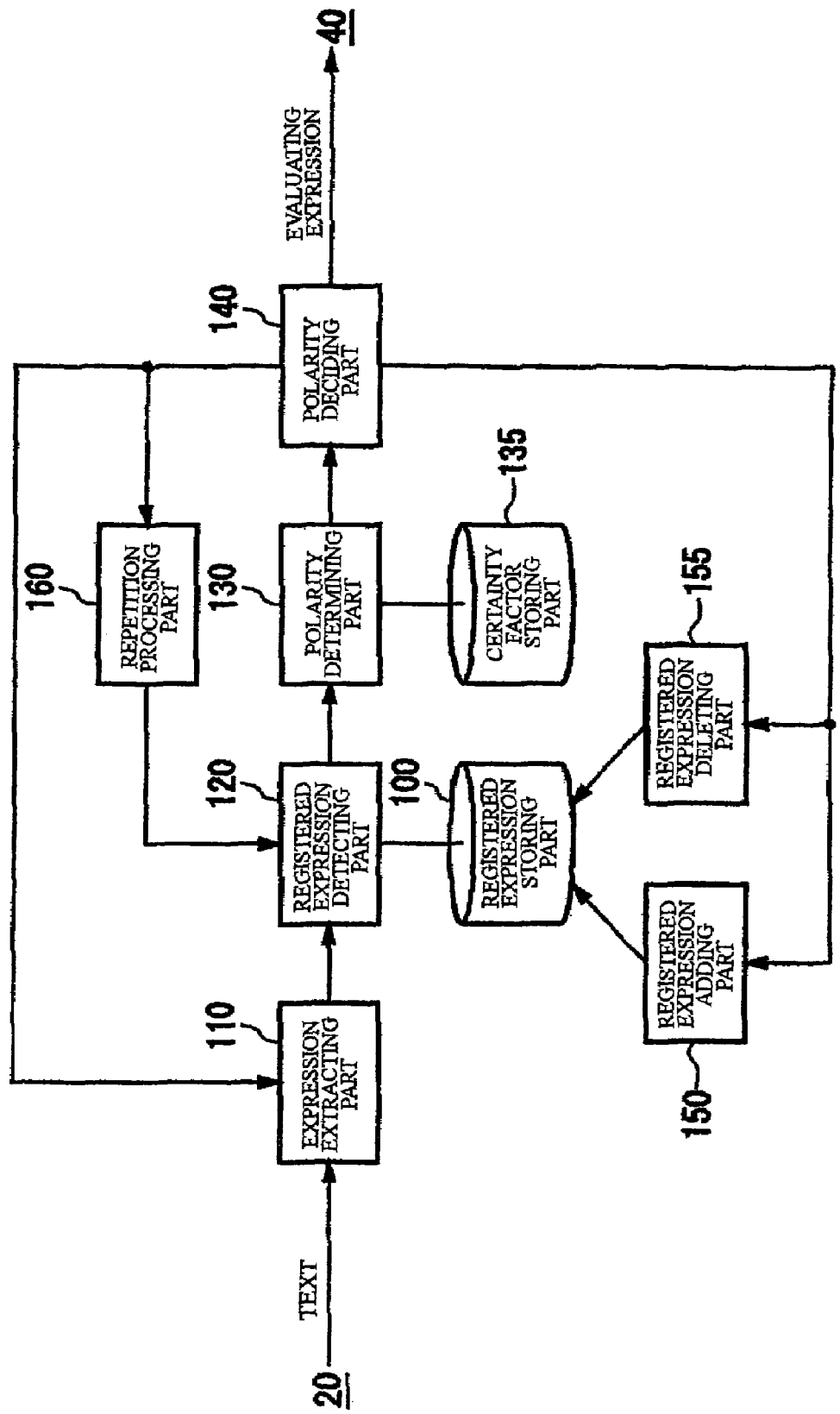

[Figure 4]
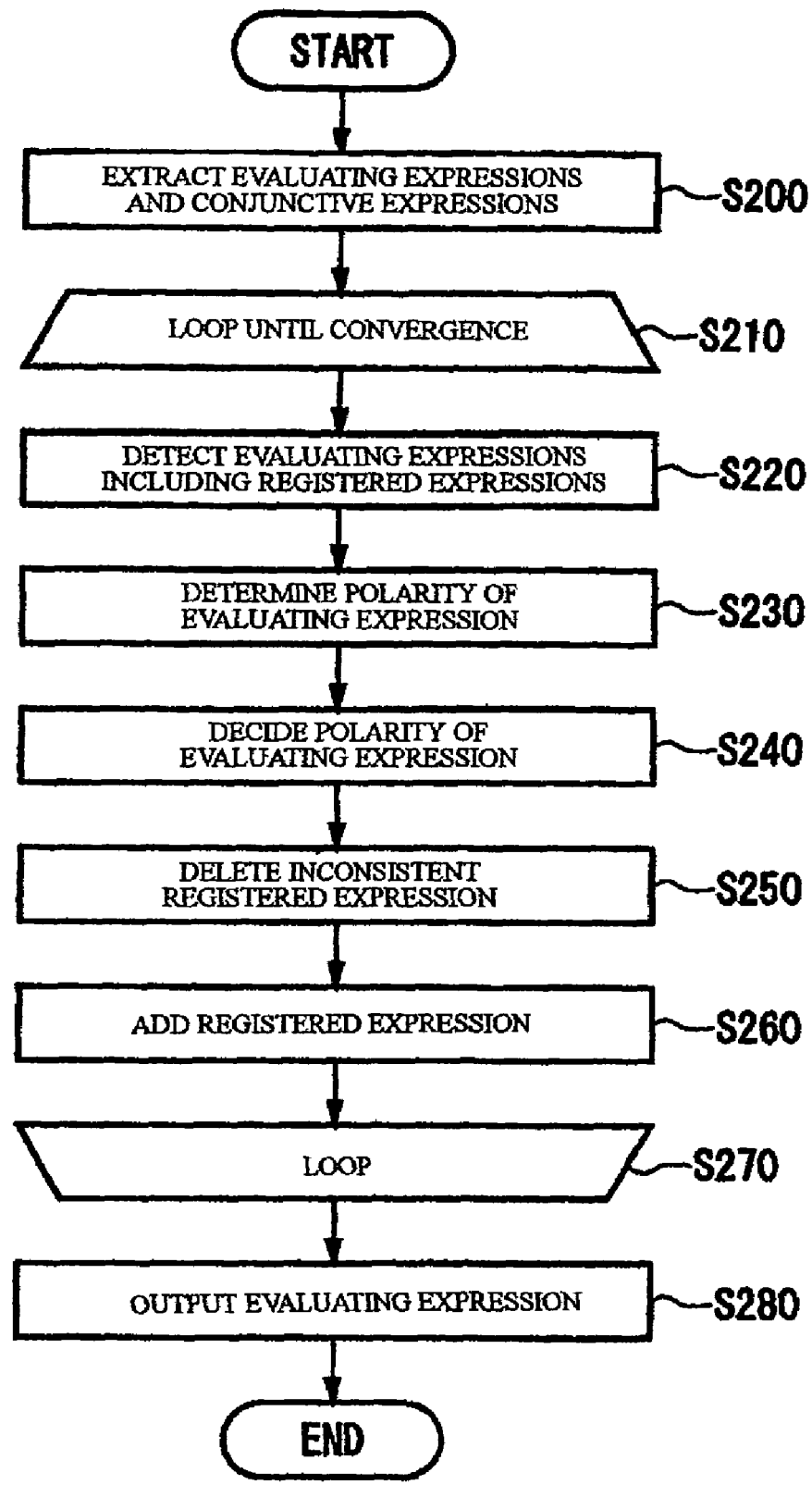

[Figure 5]
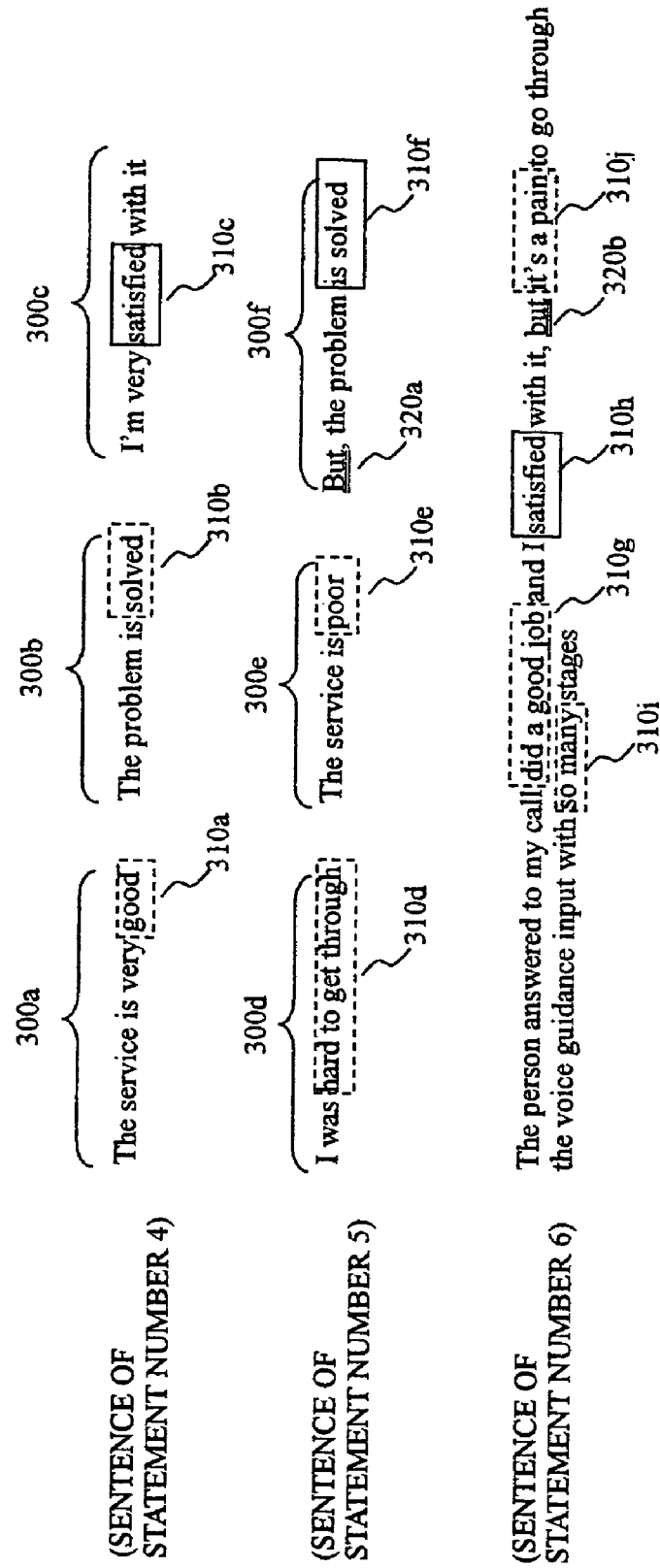

[Figure 6]
| # | REGISTERED EXPRESSION | POLARITY |
|---|---|---|
| 1 | SATISFIED | + |
| 2 | UNSATISFIED | − |
[Figure 7]
| # | EVALUATING EXPRESSION | POSITIVE POLARITY | NEGATIVE POLARITY | |
|---|---|---|---|---|
| 1 | think | 91 | 34 | |
| 2 | do | 78 | 39 | |
| 3 | use | 71 | 42 | |
| 4 | be | 61 | 30 | |
| 5 | buy | 48 | 21 | |
| 6 | for reference → be | 11 | 1 | → + |
| 7 | light | 10 | 1 | → + |
| 8 | be taken | 8 | 2 | |
| 9 | have a hard time | 4 | 6 | |
| 10 | change | 7 | 3 | |
| 11 | trouble → be | 0 | 3 | → − |
| 12 | battery → long life | 5 | 0 | → + |

[Figure 8]

| # | REGISTERED EXPRESSION | POLARITY |
|---|---|---|
| 1 | satisfied | + |
| 2 | unsatisfied | − |
| 3 | can use | + |
| 4 | like | + |
| 5 | see | + |
| 6 | recommend | + |
| 7 | for reference → be | + |
| 8 | lesson → be | + |
| 9 | image quality → poorer | − |
| 10 | noise → big | − |
| 11 | trouble → be | − |
| 12 | light | + |
| 13 | low price | + |
| 14 | fast | + |
| 15 | unknown | − |

[Figure 9]

| STATEMENT NUMBER | EVALUATING EXPRESSION | ATTRIBUTE | | | | PO-LARITY | CAUSE/REASON |
|---|---|---|---|---|---|---|---|
| | | AGE GROUP | SEX | DATE AND TIME | REGION | | |
| 1 | BITTER | 20s | MALE | 2004/9/10 | KANAGAWA PREFECTURE | + | with |
| 2 | THIN | 30s | MALE | 2004/9/10 | TOKYO | − | without |
| 2 | TASTES THIN | 30s | MALE | 2004/9/10 | TOKYO | − | without |
| 3 | LOW CALORIE | 40s | FEMALE | 2004/9/10 | KANAGAWA PREFECTURE | + | without |

90

[Figure 10]
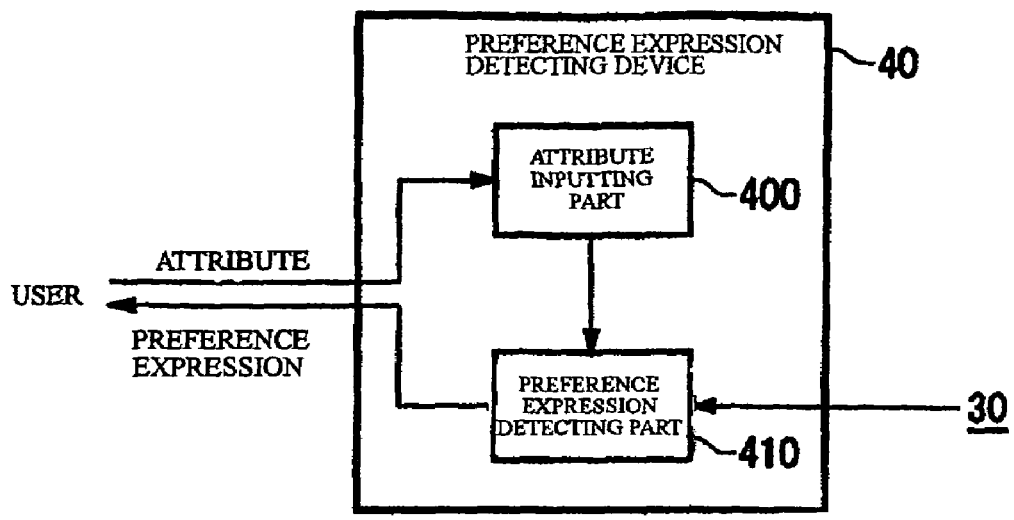
[Figure 11]
| REFERENCE EXPRESSION | POSITIVE POLARITY | NEUTRAL/UNPROVEN | NEGATIVE POLARITY |
|---|---|---|---|
| BITTER | 10 | 20 | 50 |
| THIN | 30 | 240 | 80 |
| TASTES THIN | 10 | 60 | 60 |
|  |  |  |  |

[Figure 12]
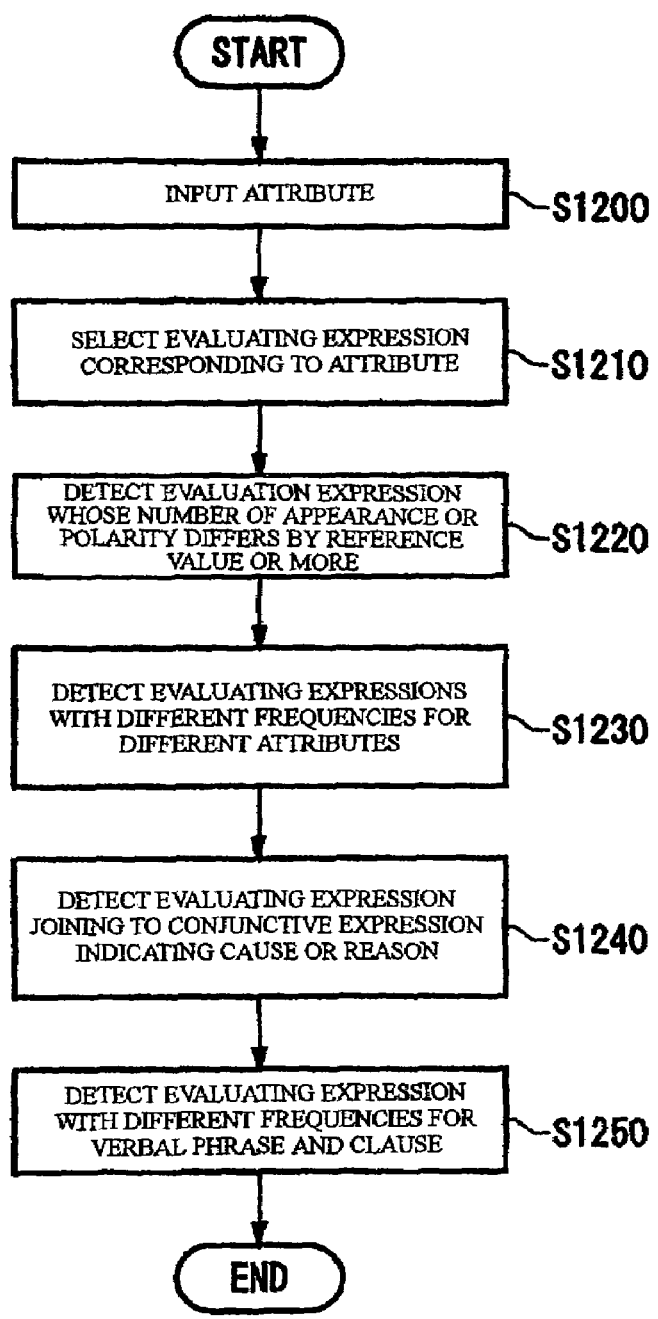
[Figure 13]
| EVALUATING EXPRESSION \ AGE | 20s | 30s | 40s |
|---|---|---|---|
| BITTER | 36 | 62 | 60 |
| TASTES THIN | 5 | 12 | 15 |

[Figure 14]

(SENTENCE OF STATEMENT NUMBER 1)

AA beer is bitter and I like it.
           620    600    610

|  | tea...strong | is strong | ...... | WHOLE |
|---|---|---|---|---|
| like (+) | 40 | 80 | ...... | 100 |
| don't like (−) | 10 | 20 | ...... | 100 |
| neutral | 50 | 100 | ...... | 200 |
| TOTAL | 100 | 200 | ...... | 400 |

(b)

|  | tea...strong | is strong | ...... | WHOLE |
|---|---|---|---|---|
| like (+) | 50 | 80 | ...... | 100 |
| don't like (−) | 10 | 20 | ...... | 100 |
| neutral | 40 | 100 | ...... | 200 |
| TOTAL | 100 | 200 | ...... | 400 |

[Figure 16]

| PERIOD / EVALUATING EXPRESSION | THE LAST ONE YEAR | FROM TWO YEARS AGO TO ONE YEAR AGO | FROM THREE YEARS AGO TO TWO YEARS AGO |
|---|---|---|---|
| FAST AUTO-FOCUS | POSITIVE POLARITY 100% | POSITIVE POLARITY 0% | POSITIVE POLARITY 0% |
| OUT OF FOCUS | NEGATIVE POLARITY 0% | NEGATIVE POLARITY 100% | NEGATIVE POLARITY 100% |
| SOFTWARE IS EXCELLENT | POSITIVE POLARITY 100% | POSITIVE POLARITY 0% | POSITIVE POLARITY 0% |
| RETOUCH TECHNIQUE IS DIFFICULT | NEGATIVE POLARITY 100% | NEGATIVE POLARITY 0% | NEGATIVE POLARITY 0% |

[Figure 17]
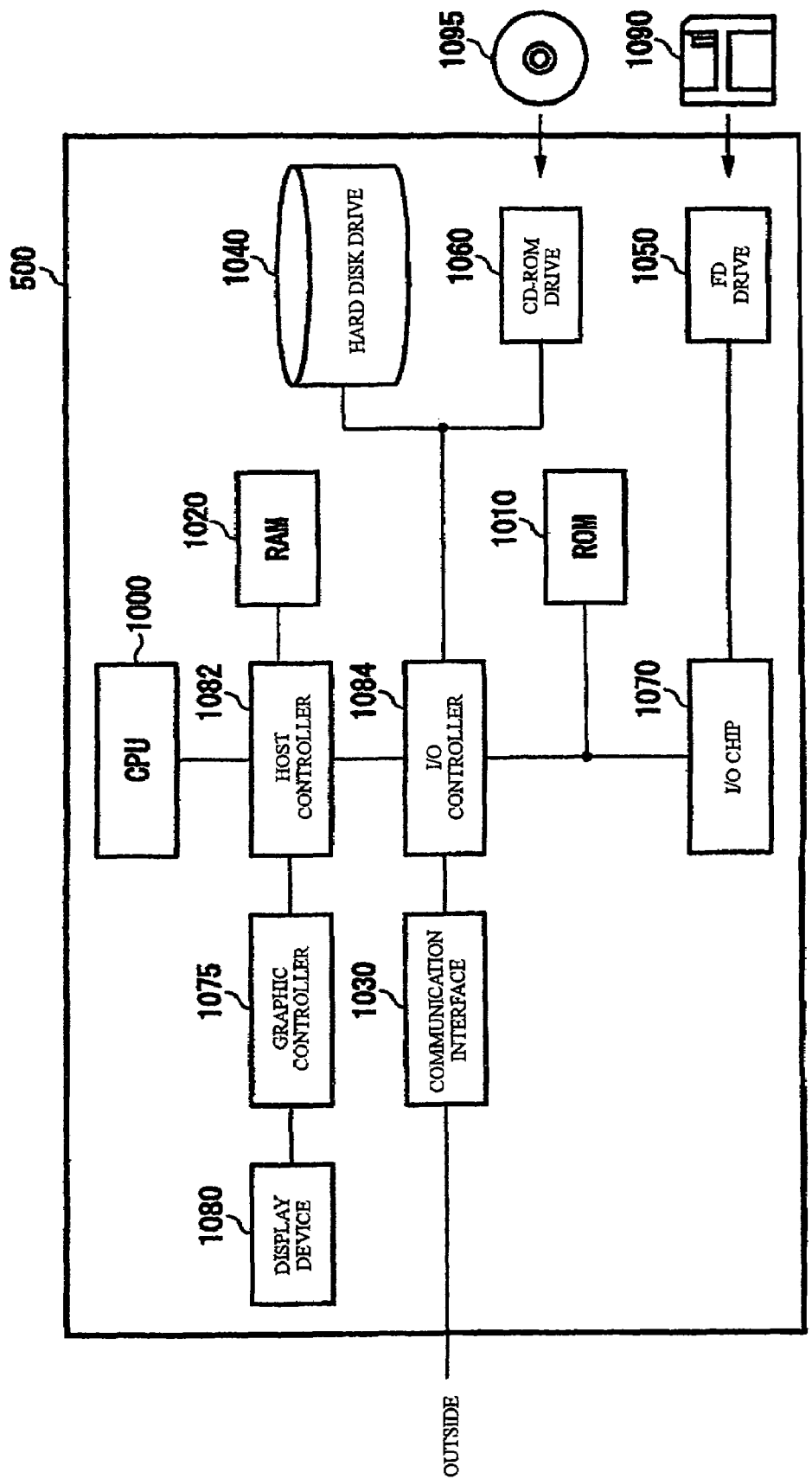

EXPRESSION DETECTING SYSTEM, AN EXPRESSION DETECTING METHOD AND A PROGRAM

BACKGROUND OF THE INVENTION

1. Field of the Invention

The present invention relates to an expression detecting system, an expression detecting method and a program. Specifically, the present invention relates to an expression detecting system, an expression detecting method and a program for detecting an expression describing an evaluation of a specific object from a text describing the evaluation of said specific object.

2. Background Art

In developing a new product or a new service, it has become more and more important to catch up with consumers' preference (likes and dislikes) correctly and set the preference that appear to start a trend as a basic concept of the development. For example, a brewery developed their new brand of beer with an explicit concept of "dry" in mid-1980s. The product made a hit and brought the company to the top of the industry. As such, how correctly a company notices an expression including appropriate preference will determine the future of the company.

Generally, individual preference varies with an attribute of a group, such as a generation or a region as well as time. Therefore, it is important to periodically monitor individual preference, immediately notice a change in the trend and make best use of the change in developing a new product or service. In the conventional arts, however, stereotyped data such as questionnaire items or a purchase history is used for analyzing the trend (see Published Unexamined Patent Application No. 2003-203136 and Published Unexamined Patent Application No. 2000-293526)

Stereotyped data such as questionnaire items only yields evaluations selected from predetermined choices made by those who made the questionnaire or responses to questions made by those who made the questionnaire. In order to solve this problem, a technique for analyzing evaluations of a product or the like based on a normal sentence as well as on stereotyped data such as a questionnaire is proposed (see Published Unexamined Patent Application No. 2002-297626, Published Unexamined Patent Application No. 2003-248681, and Published Unexamined Patent Application No. 2002-140465.

The technique disclosed in Published Unexamined Patent Application No. 2002-297626 intends to learn individual preference (likes and dislikes) for an advertisement on the basis of non-stereotyped text data written on the advertisement. This technique uses a preference expression rules dictionary to extract likes and dislikes. For this reason, it is assumed that a user manually records keywords relating to preference in the dictionary beforehand. In the technique disclosed in Published Unexamined Patent Application No. 2003-248681, an affect term included in an expression indicating an emotion is recorded in a dictionary beforehand an expression including the affect term is detected as an expression indicating the emotion. For this reason, any expression that is not assumed cannot be detected as an expression indicating an emotion.

Published Unexamined Patent Application No. 2002-140465 discloses a technique for determining whether a keyword detected from text data indicates a favorable (affirmative) opinion about the object or not. This technique prepares a database that has registered whether each of the keywords indicates a favorable opinion or not, and determines whether a keyword detected from text data is registered in the database or not.

In such conventional arts, it is assumed that the expression which appears in text data is already recorded in database to enable determination of whether or not the expression indicates individual preference. For this reason, it is difficult to find a new expression indicating individual preference and apply the expression to marketing.

SUMMARY OF THE INVENTION

The object of the present invention is to provide an expression detecting system, an expression detecting method and a program for solving the abovementioned problem. This object is attained by combining features described in independent claims of the claims. Dependent claims state more advantageous specific examples of the present invention.

In order to solve the abovementioned problem, the first embodiment of the present invention provides an expression detecting system for detecting preference expressions indicating evaluators' likes and dislikes of a specific object from texts describing the evaluations of the specific object, including:

a text storing part for storing each of the texts describing the evaluations of a specific object in association with an attribute of the text;

an expression extracting part for extracting an evaluating expression describing the evaluations of the specific object from each of the texts;

a polarity determining part for determining whether the evaluating expression extracted by the expression extracting part has the positive polarity or the negative polarity, wherein the positive polarity indicates a favorable (affirmative) evaluation of the specific object and the negative polarity indicates an unfavorable (negative) evaluation of the specific object;

an attribute inputting part for inputting an attribute of a text that is designated as an object for detecting the preference expressions; and a preference expression detecting part for detecting an evaluating expression, which is detected from a text having an attribute input by the attribute inputting part, from evaluating expressions extracted by the expression extracting part as a preference expression, and outputting the preference expression in association with a frequency of the preference expressions being determined as a positive polarity or a negative polarity in the text having the attribute; and an expression detecting method that uses the expression detecting system, and a program that causes a computer to function as the expression detecting system.

The abovementioned outline of the present invention does not comprehend all the features required for the present invention, and any sub combinations of the features can be included in the present invention.

According to the present invention, a preference expression indicating persons' likes and dislikes of a commercial product or the like can be correctly detected.

BRIEF DESCRIPTION OF THE DRAWINGS

Various embodiments and exemplifications of the invention are illustrated in the drawings.

FIG. 1 shows a configuration of an expression detecting system 10 according to the embodiment of the present invention;

FIG. 2 shows an exemplary data structure of the text storing part 20 according to the embodiment of the present invention;

FIG. 3 shows a configuration of the evaluating expression extracting device 30 according to embodiment of the present invention;

FIG. 4 shows an operational flow of the evaluating expression extracting device 30 according to the embodiment of the present invention;

FIG. 5 shows an exemplary sentence to be processed by the evaluating expression extracting device 30 according to the embodiment of the present invention;

FIG. 6 shows an example of registered expressions previously registered in the registered expression storing part 100 according to the embodiment of the present invention;

FIG. 7 shows an example of the evaluating expressions whose polarity is determined by the polarity determining part 130 according to the embodiment of the present invention;

FIG. 8 shows an example of registered expressions registered in the registered expression storing part 100 according to the embodiment of the present invention;

FIG. 9 shows an example of the evaluating expressions 90 outputted from the evaluating expression extracting device 30 according to the embodiment of the present invention;

FIG. 10 shows a configuration of the preference expression detecting device 40 according to the embodiment of the present invention;

FIG. 11 shows an example of preference expressions detected by the preference expression detecting device 40 according to the embodiment of the present invention;

FIG. 12 shows an operational flow of the preference expression detecting device 40 according to the embodiment of the present invention;

FIG. 13 is a list for illustrating the processing of S1230 in FIG. 12;

FIG. 14 illustrates the processing of S1240 in FIG. 12;

FIG. 15 is a list for illustrating the processing of S1250 in FIG. 12;

FIG. 16 shows a specific example of a preference expression actually detected by the expression detecting system 10 according to the embodiment of the present invention; and FIG. 17 shows an exemplary hardware configuration of a computer 500 that functions as the preference expression detecting device 40.

DETAILED DESCRIPTION OF THE INVENTION

The present invention will be described by using an embodiment of the invention, though; the embodiment below does not limit the present invention described in the claims and not all the combinations of features described in the embodiment are needed for means solving the problems in the present invention.

FIG. 1 shows a configuration of an expression detecting system 10 according to the embodiment of the present invention. The expression detecting system 10 detects a preference expression indicating evaluator's likes and dislikes of a specific object from texts describing evaluations of the object. This enables the system to detect an expression anew that was unpredictable to be an expression indicating preference as an expression describing likes and dislikes. The present invention intends to use this system in developing or marketing a product, which is an object of evaluation, as a new product.

The expression detecting system 10 includes a text storing part 20, an evaluating expression extracting device 30 and a preference expression detecting device 40. The text storing part 20 stores each of texts describing evaluations of a specific object in association with an attribute of the text. The evaluating expression extracting device 30 extracts evaluating expressions indicating evaluations of the specific object from each of the texts stored in the text storing part 20 and sends the extracted evaluating expressions to the preference expression detecting device 40.

The preference expression detecting device 40 detects a preference expression from the evaluating expressions extracted by the evaluating expression extracting device 30 and outputs the preference expression to a user. This enables the user to recognize a hackneyed expression or an expression emerging to indicate a favorable evaluation and to use the knowledge in marketing or the like.

FIG. 2 shows an exemplary data structure of the text storing part 20 according to the embodiment of the present invention. The text storing part 20 is built by collecting persons' messages from a bulletin board on the Internet, for example. The text storing part 20 stores statement numbers described in the text and an attribute of the text in association with each of the texts. An attribute of the text here includes the date and time the text was made, the age group of an evaluator who is evaluating a specific object in the text, the sex, and the residential area (region) of the evaluator (or subject).

For example, in the statement number 1, a man in 20's living in Kanagawa prefecture says "AA beer is bitter and I like it." This statement was made on Sep. 10, 2004. In the statement number 2, a man in 30's living in Tokyo says "I don't like BB beer. It's thin." This statement was also made on Sep. 10, 2004.

FIG. 3 shows a configuration of the evaluating expression extracting device 30 according to embodiment of the present invention. The evaluating expression extracting device 30 obtains a text describing evaluations of the specific object from the text storing part 20. Then the evaluating expression extracting device 30 extracts an evaluating expression, which is an expression to indicate an evaluation of the object, from the text and determines the polarity of the evaluating expression. Evaluating expressions often appears one after another in such a text, with an inclination that favorable evaluating expressions often appear close to each other and unfavorable evaluating expressions often appear close to each other. The evaluating expression extracting device 30 make use of this inclination in determining that a series of evaluating expressions, which follow a favorable evaluating expression, are favorable evaluating expressions and that a series of evaluating expressions, which follow an unfavorable evaluating expression, are unfavorable evaluating expressions. When a favorable evaluating expression appears close to an unfavorable evaluating expression, an adversative expression (Gyakusetsu) including "tada", "shikashi", "ga" and "kedo" (meaning "but" or "however") is often inserted between the expressions. When an adversative expression appears between two evaluating expressions, the evaluating expression extracting device 30 determines that the two evaluating expressions have polarities opposite to each other.

The evaluating expression extracting device 30 includes a registered expression storing part 100, an expression extracting part 110, a registered expression detecting part 120, a polarity determining part 130, a certainty factor storing part 135, a polarity deciding part 140, a registered expression adding part 150, a registered expression deleting part 155, and a repetition processing part 160. The registered expression storing part 100 registers an evaluating expression with the predetermined polarity as a registered expression. In the embodiment, the polarity of an evaluating expression is determined as positive when the evaluation is favorable and as negative when the evaluation is unfavorable.

The expression extracting part 110 obtains a text describing an evaluation of a specific object from the Internet or a file. The object here is an object to be evaluated by consumers or a rating agency about a product, a service or a company. The expression extracting part 110 extracts evaluating expressions and conjunctive expressions, which are expressions to indicate conjunctive relationship between the evaluating expressions, from the text and outputs them to the registered expression detecting part 120.

The registered expression detecting part 120 detects evaluating expressions including registered expressions, which is registered in the registered expression storing part 100, from the evaluating expressions input from the expression extracting part 110. Then the registered expression detecting part 120 outputs the registered expressions included in the detected evaluating expressions and respective polarities to the polarity determining part 130 along with the evaluating expressions and the conjunctive expressions input from the expression extracting part 110.

The polarity determining part 130 determines the polarity of each of the evaluating expressions based on the evaluating expressions and the conjunctive expressions extracted by the expression extracting part 110, and the evaluating expressions including the registered expressions and the polarity of the registered expression. When an evaluating expression appears multiple places in a text, the polarity determining part 130 determines the polarity of the evaluating expression for each of the places.

The certainty factor storing part 135 previously stores certainty factor, which indicates the degree of a conjunctive expression being non-adversative conjunctive expression (e.g. "and", "moreover") or adversative expression (e.g. "but", "however"), for each type of conjunctive expressions. The certainty factor is predetermined by one who registers conjunctive expressions in the evaluating expression extracting device 30 and registered in the certainty factor storing part 135. The polarity determining part 130 may obtain certainty factor for each of the conjunctive expressions included in a text from the certainty factor storing part 135 and determine the polarity of an evaluating expression further based on the certainty factor.

The polarity deciding part 140 inputs the polarity of the evaluating expression, which appears multiple places in a text, for each of the places from the polarity determining part 130 and decides the polarities of the evaluating expression based on each of the polarities. The polarity deciding part 140 outputs each of the evaluating expressions extracted from the text to the preference expression detecting device 40 in association with an attribute of the text, from which the evaluating expression is extracted, and the polarity determined for the evaluating expression.

The registered expression adding part 150 adds an evaluating expression, whose polarity is determined by the polarity determining part 130 and decided by the polarity deciding part 140, to the registered expression storing part 100 as a new registered expression. When the polarity of the evaluating expression, which is determined by the polarity determining part 130 and decided by the polarity deciding part 140, is inconsistent with the polarity of the registered expression corresponding to the evaluating expression, which is registered in the registered expression storing part 100, the registered expression deleting part 155 deletes the registered expression from the registered expression storing part 100. This enables the registered expression deleting part 155 to keep the polarities of the registered expressions in the registered expression storing part 100 correct.

The repetition processing part 160 causes the registered expression detecting part 120, the polarity determining part 130, the polarity deciding part 140, the registered expression adding part 150 and the registered expression deleting part 155 to repeat respective processing on the basis of the registered expression storing part 100, to which a new registered expression is added by the registered expression adding part 150. This enables the evaluating expression extracting device 30 to determine and decide the polarity even for the evaluating expression, whose polarity is unable to be determined and decided through the processing using the registered expressions previously registered, by using registered expressions added anew.

FIG. 4 shows an operational flow of the evaluating expression extracting device 30 according to the embodiment of the present invention. First, the expression extracting part 110 obtains a text, which describes an evaluation of a specific object in a natural language, from the text storing part 20 and extracts multiple evaluating expressions and conjunctive expressions from the text (step S200).

More specifically, the expression extracting part 110 parses the text and extracts a sentence, a clause or a phrase, which indicates an evaluation of the object, as an evaluating expression. Further specifically, the expression extracting part 110 detects a verb phrase, which indicates an evaluation of the object, and also detects a clause including a set of a noun phrase and a verb phrase, which indicates an evaluation of the object. When a text is in Japanese, for example, the expression extracting part 110 may detect a clause including a noun phrase, a particle (postpositional word) and a declinable word.

The expression extracting part 110 may obtain multiple texts all together from the text storing part 20 and perform the extracting processing for a single text formed by combining those texts. Alternatively, the expression extracting part 110 may repeat the extracting processing for each of the texts.

Then, the repetition processing part 160 causes the processing from S220 through S260 to be repeated until determination of the polarities for each of the multiple evaluating expressions extracted from the text completes or converges (S210, S270).

In the repetition processing, the registered expression detecting part 120 detects evaluating expressions, which include registered expressions stored in the registered expression storing part 100, from the multiple evaluating expressions (S220).

Then, the polarity determining part 130 determines the polarity of each evaluating expression (S230). More specifically, the polarity determining part 130 determines that an evaluating expression, which is joined to an evaluating expression including a registered expression by a non-adversative conjunctive expression, and a series of evaluating expressions, which are neither joined to the evaluating expression by either a non-adversative conjunctive expression or an adversative expression nor joined to each other by either a non-adversative conjunctive expression or an adversative expression have the same polarity as that of the registered expression.

When an evaluating expression including a registered expression A, a non-adversative conjunctive expression B, an evaluating expression C, an evaluating expression D, an evaluating expression E, and an evaluating expression F appear in this order, the polarity determining part 130 first determines that the evaluating expression C joined to the evaluating expression A by the non-adversative conjunctive expression B has the same polarity as that of the registered expression. The polarity determining part 130 also determines that evaluating expressions D, E and F, which are a series of evaluating expressions that are neither joined to the evaluating expression C by either a non-adversative conjunctive expression or an adversative expression nor joined to each other by either a non-adversative conjunctive expression or an adversative expression, have the same polarity as that of the registered expression.

The polarity determining part 130 determines that an evaluating expression joined to an evaluating expression, which includes a registered expression, by an adversative expression and a series of evaluating expressions that are neither joined to the evaluating expression by either a non-adversative conjunctive expression or an adversative expression nor joined to each other by either a non-adversative conjunctive expression or an adversative expression, have the polarity opposite to that of the registered expression.

When an evaluating expression including a registered expression A, an adversative expression B, an evaluating expression C, an evaluating expression D, an evaluating expression E and an evaluating expression F appear in this order, the polarity determining part 130 first determines that the evaluating expression C joined to the evaluating expression A by an adversative expression B has the polarity opposite to that of the registered expression. The polarity determining part 130 also determines that evaluating expressions D, E and F, which are a series of evaluating expressions that are neither joined to the evaluating expression C by either a non-adversative conjunctive expression or an adversative expression nor joined to each other by either a non-adversative conjunctive expression or an adversative expression, have the polarity opposite to that of the registered expression.

The polarity determining part 130 may perform the abovementioned determination on an evaluating expression, which appears later than the evaluating expression including a registered expression in the text, as well as on an evaluating expression, which appears earlier than the evaluating expression including a registered expression in the text. The polarity determining part 130 may first determine the polarity of the evaluating expression C that is joined to the evaluating expression A by the conjunctive expression B, and in the next repetition, determine the polarity of the evaluating expression D next to the evaluating expression C that is registered in the registered expression storing part 100 as a registered expression, then in another repetition, determine the polarity of the evaluating expression E next to the evaluating expression D that is registered in the registered expression storing part 100 as a registered expression. In this case, the polarity determining part 130 may select each of the series of evaluating expressions that are not joined either by either a non-adversative conjunctive expression or an adversative expression one after another in each repetition and determine that each of them has the same polarity.

In the case that an evaluating expression includes no registered expression, the polarity determining part 130 may perform the abovementioned polarity determination in the processing of S230. This enables the polarity determining part 130 to converge the polarity determination for each of multiple evaluating expressions earlier by avoiding the determination for the registered expression whose polarity was once determined, and which was registered in the registered expression storing part 100.

The polarity determining part 130 may further determine certainty factor of the polarity of an evaluating expression joined to an evaluating expression including a registered expression by either a non-adversative conjunctive expression or an adversative expression; and a series of evaluating expressions that are neither joined to the evaluating expression by either a non-adversative conjunctive expression or an adversative expression nor joined to each other by either a non-adversative conjunctive expression or an adversative expression, based on the certainty factor of the non-adversative conjunctive expression.

A conjunction "Shikashi", an example of conjunctive expressions, is never used as a non-adversative conjunction expression. Thus, the certainty factor storing part 135 keeps the certainty factor of the conjunction "Shikashi" being an adversative expression to a high value. On the other hand, a conjunction "Ga", another example of conjunctive expressions, may be used as a non-adversative conjunction expression. For example, the conjunction "ga" in the sentence "Yoi to-no hyouban wo kite-ita-ga, jissai wa warukatta." is an adversative postpositional, while the conjunction "ga" in the sentence "Yoi to-no hyouban wo kite-ita-ga, yahari hyouban-doori deatta." is a non-adversative postpositional. Thus, the certainty factor storing part 135 keeps the certainty factor of the conjunctive postpositional "ga" being an adversative expression to a value lower than that of "Shikashi". This enables the polarity determining part 130 to determine that the certainty factor of an evaluating expression joined to an evaluating expression with a positive polarity by "Shikashi" having a negative polarity is higher than the certainty factor of an evaluating expression joined to an evaluating expression with a positive polarity by "ga" having a negative polarity.

Then, the polarity deciding part 140 decides the polarity of the evaluating expression based on the polarity of an evaluating expression, which appears at multiple places in a text, for each of the places (S240). More specifically, when the polarity of an evaluating expression, which appears at multiple places in a text, is determined as the same with the ratio higher than a predetermined ratio, the polarity deciding part 140 decides the polarity of the declinable word to that of the evaluating expression determined as the same with the ratio higher than a predetermined ratio.

The polarity deciding part 140 may decide the polarity of an evaluating expression, which appears in multiple places in a text, on the basis of the certainty factor for the polarity in each of the places. For example, the polarity deciding part 140 weighs the polarity of an evaluating expression, which appears in multiple places in a text, for each of the places by the certainty factor of the polarity, and decides the polarity of the evaluating expression on the basis of the weighed polarity. When a sentence "A (positive polarity), but B." and an expression ". . . is C (negative polarity). But it is B." appear in a text, the polarity determining part 130 determines that B has a negative polarity (with low certainty factor) on the basis of the first sentence and that B has a positive polarity (with high certainty factor) on the basis of the latter sentence. As a result, the polarity deciding part 140 can decide that B has a positive polarity on the basis of the certainty factors.

Next, when an evaluating expression whose polarity is determined by the polarity determining part 130 is registered in the registered expression storing part 100 as a registered expression and the evaluating expression and the registered expression have different polarities, the registered expression deleting part 155 deletes the registered expression from the registered expression storing part 100 (S250). Among evaluating expressions appearing multiple places in a text, when the polarity of the evaluating expression appearing in places having a predetermined ratio or more is different from that of a registered expression included in the evaluating expression registered in the registered expression storing part 100, the registered expression deleting part 155 may delete the registered expression from the registered expression storing part 100. The ratio may be the same as or different from that is used for polarity decision by the polarity deciding part 140.

Then, the registered expression adding part 150 adds an evaluating expression whose polarity is determined by the polarity determining part 130 and decided by the polarity deciding part 140 to the registered expression storing part 100 as a new registered expression (S260). When an evaluating expression, which appears in multiple places in multiple texts, has the same polarity in places having a predetermined ratio or more in all the texts with different attributes, the registered expression adding part 150 may add the evaluating expression to the registered expression storing part 100 as a registered expression. This enables an expression with universal polarity regardless of the attribute to be added as a registered expression for more accurate polarity determination in future.

The repetition processing part 160 causes the processing from S220 to S260 until the polarity determination for each of the evaluating expressions completes or converges (S210, S270). When a polarity of any of the evaluating expressions is decided anew or a polarity is changed through the abovementioned processing from S220 to S260, the repetition processing part 160 causes the processing from S220 to S260 to be repeated.

Then, the polarity deciding part 140 outputs each of the multiple evaluating expressions extracted form the texts to the preference expression detecting device 40 in association with the attribute of a text, from which the evaluating expression is extracted, and the polarity determined for the evaluating expression (S280). Alternatively, the polarity deciding part 140 may output each of the evaluating expressions, whose polarity is determined by the polarity determining part 130, to the preference expression detecting device 40 at each time of the determination. When any of the evaluating expressions is joined to the registered expression by a conjunctive expression, which describes a cause or a reason, the polarity deciding part 140 may output information on the conjunctive expression in association with the evaluating expression for each of the evaluating expressions.

The evaluating expression extracting device 30 described above can appropriately decide the polarity of each of evaluating expressions included in a text and register it as a registered expression by making use of the tendency of a certain evaluating expression to follow and to be followed by evaluating expressions with the same polarity, and the tendency of an adversative expression to appear between a favorable (affirmative) evaluating expression and an unfavorable (negative) evaluating expression. This enables the evaluating expression extracting device 30 to determine the polarity of each evaluating expression more appropriately on the basis of registered expressions that are effectively extracted and registered.

FIG. 5 shows an exemplary sentence to be processed by the evaluating expression extracting device 30 according to the embodiment of the present invention. The evaluating expression extracting device 30 according to the embodiment extracts an expression by sentence or phrase as an evaluating expression and performs the processing. In FIG. 5, the specific example of the processing will be described by using texts of the statement numbers 4 to 6 in FIG. 2 as an example.

(1) Processing by Sentence

The sentences of the statement numbers 4 and 5 in FIG. 5 exemplify processing by sentence. In the processing by sentence, the expression extracting part 110 extracts at least a part of each of the sentences included in a text as each of the evaluating expressions. The expression extracting part 110 also extracts a conjunction added to each of the sentences as a conjunctive expression.

The sentences of statement number 4 in FIG. 5 are three sentences 300a-c: "The service is very good.", "The problem is solved." and "satisfied." The expression extracting part 110 extracts evaluating expressions 310a-c, which are verbal phrases in the respective sentences. As the sentences 300a-c are neither joined by a non-adversative conjunction expression nor an adversative expression, the expression extracting part 110 does not extract a conjunction from the sentences of statement number 4.

When the evaluating expression 310c is registered in the registered expression storing part 100 as a registered expression with a positive polarity, the polarity determining part 130 determines that evaluating expressions 310a-b included in a series of sentences 300a-b, which are neither joined to a sentence 300c including an evaluating expression 310c that includes a registered expression by either a non-adversative conjunction expression or an adversative expression nor joined to each other by either a non-adversative conjunctive expression or an adversative expression, have the positive polarity, which is the same as that of the evaluating expression 310c. Similarly, the polarity determining part 130 determines that an evaluating expressions included in a series of sentences, which are neither joined to a sentence including an evaluating expression that includes a registered expression with a negative polarity by either a non-adversative conjunction expression or an adversative expression nor joined to each other by either a non-adversative conjunctive expression or an adversative expression, have the negative polarity, which is the same as that of the registered expression. This enables the polarity determining part 130 to correctly determine the two evaluating expressions "is good" and "solved" as favorable evaluating expressions.

The sentences of statement number 5 in FIG. 5 are three sentences 300d-f: "hard to get through.", "the service is poor." and "But . . . solved." The expression extracting part 110 extracts evaluating expressions 310d-f, which are verbal phrases in the respective sentences. As the sentences 300e and 300f are joined by a conjunctive expression 320a, which is an adversative expression, the expression extracting part 110 extracts the conjunctive expression 320a.

When the evaluating expression 310f is registered in the registered expression storing part 100 as a registered expression with a positive polarity, the polarity determining part 130 determines that an evaluating expression 310e included in a sentence 300e, which is joined to a sentence 300f including an evaluating expression 310f that includes a registered expression by an adversative expression 320a; and an evaluating expression 310d included in a series of sentences 300d, which are neither joined to the sentence 300e by either a non-adversative conjunction expression or an adversative expression nor joined to each other by either a non-adversative conjunction expression or an adversative expression, have the same polarity as that of the registered expression. Similarly, the polarity determining part 130 determines that evaluating expressions included in a sentence, which is joined to a sentence including an evaluating expression that includes a registered expression by a non-adversative conjunction expression and evaluating expressions included in a series of sentences, which are neither joined to the sentence by either a non-adversative conjunction expression or an adversative expression or joined to each other by either a non-adversative conjunction expression or an adversative expression, have the same polarity as that of the registered expression. This enables the polarity determining part 130 to correctly determine the two evaluating expressions "hard to get through" and "is poor" as unfavorable evaluating expressions.

When sentences included in a text has two or more phrases, the expression extracting part 110 may extract a phrase, which forms a key (chief) element of each of the sentences included in the text, as each of the evaluating expressions. The phrase that forms a key element of a sentence here is the last phrase in a Japanese sentence, and refers to a phrase that forms a main part of the content expressed by the sentence in a sentence including multiple phrases.

Then, the polarity determining part 130 may determine that an evaluating expression, which forms a key element of a sentence joined to a sentence whose key element is an evaluating expression including a registered expression by a non-adversative conjunctive expression or an adversative expression and an evaluating expression, which is a key element of a series of sentences that are neither joined to a sentence whose key element is the evaluating expression by either a non-adversative conjunctive expression or an adversative expression nor joined to each other by either a non-adversative conjunctive expression or an adversative expression, have a polarity the same as or different from that of the registered expression.

The expression extracting part 110 may extract at least a part of a sentence that does not satisfy a predetermined exceptive condition among sentences included in a text as each of evaluating expressions. The exceptive condition may be, for example, that the expression extracting part 110 parses the sentence and determines it as a question or determines it as a sentence expressing an intention. This enables the expression extracting part 110 to exclude a sentence, which does not describe an objective evaluation, from the evaluating expressions to be extracted.

(2) Processing by Phrase

The sentence of the statement number 6 in FIG. 5 exemplifies processing by phrase. In the processing by phrase, the expression extracting part 110 according to the embodiment extracts declinable words, which form a headword in each of the phrases making up a sentence included in a text, as evaluating expressions. The expression extracting part 110 also extracts conjunctive expressions, such as a conjunction or a conjunctive postpositional, that are inserted between phrases.

The sentence of the statement number 6 in FIG. 5 includes four evaluating expressions 310g-j; a declinable word "did a good job", which is a headword in the phrase "The person answered to my call did a good job" a declinable word "satisfied", a declinable word "so many" in a phrase "to go through the voice guidance input with so many stages", and a declinable word "it's a pain to". The expression extracting part 110 extracts evaluating expressions 310g-j and a conjunctive expression 320b, which is a conjunctive postpositional, from the sentence of the statement number 6.

When the evaluating expression 310h is registered in the registered expression storing part 100 as a registered expression with the positive polarity, the polarity determining part 130 determines that an evaluating expression 310 in a phrase joined to a phrase including a registered expression of an evaluating expression 310h by an adversative expression 320b and an evaluating expression 310j in a series of phrases, which are neither joined to a phrase including the evaluating expression 310i by either a non-adversative conjunctive expression or an adversative expression nor joined to each other by either a non-adversative conjunctive expression or an adversative expression, have the polarity opposite to the registered expression. Similarly, the polarity determining part 130 determines that a declinable word in a phrase joined to a phrase including a registered expression by a conjunctive expression final resultant and a declinable word in a series of phrases, which are neither joined to the phrase by either a non-adversative conjunctive expression or an adversative expression nor joined to each other by either a non-adversative conjunctive expression or an adversative expression, have the same polarity as that of the registered expression. This enables the polarity determining part 130 to correctly determine that two evaluating expressions of a declinable word "so many" and a declinable word "it's a pain to" as unfavorable evaluating expressions.

The polarity determining part 130 determines that the evaluating expression 310g, which is a declinable word in a series of phases that are not joined to a phrase including a registered expression of the evaluating expression 310h by either a non-adversative conjunctive expression or an adversative expression, has the same polarity as that of the evaluating expression 310h. This enables the polarity determining part 130 to correctly determine that the declinable word "did a good job" as a favorable evaluating expression.

FIG. 6 shows an example of registered expressions previously registered in the registered expression storing part 100 according to the embodiment of the present invention. The registered expression storing part 100 according to the embodiment previously records an expression whose polarity in evaluation is explicitly determined without consideration of its context or a technical word as a registered expression to be a base for polarity determination of an evaluating expression, in association with the polarity of the expression. The registered expression storing part 100 according to the embodiment previously registers the expression with the positive polarity (indicated by "+" on the list) "satisfied" and the expression with the negative polarity (indicated by "−" on the list) "unsatisfied".

FIG. 7 shows an example of the evaluating expressions whose polarity is determined by the polarity determining part 130 according to the embodiment of the present invention. FIG. 7 exemplifies evaluating expressions extracted from a text describing evaluations of a digital camera. The polarity of each of the evaluating expression in the text is determined by using a registered expression registered in the registered expression storing part 100 in the processing of S220 and S230 in FIG. 2 and decided in the processing of S240.

For example, the evaluating expression "think" appears 125 (=91+34) times in the texts. The polarity determining part 130 determines that the expression has the positive polarity for 91 times and the negative polarity for 34 times. Similarly, the polarity determining part 130 determines that the expression "do" has the positive polarity for 78 times and the negative polarity for 39 times.

The expression extracting part 110 may further extract a set of an evaluating item and an expression indicating an evaluation of the evaluating item as at least one of evaluating expressions. That is to say, the expression extracting part 110 may further extract "for reference→be", which is a set of an evaluating item "for reference" and an expression "be" indicating an evaluation of "for reference", as an evaluating expression. Similarly, the expression extracting part 110 may further extract "trouble→be", which is a set of an evaluating item "trouble" and an expression "be" indicating an evaluation of "trouble", as an evaluating expression.

More specifically, the expression extracting part 110 may extract a set of a noun indicating an evaluating item, a declinable word indicating an evaluation of the evaluating item and a case postpositional for associating the noun and the declinable word, as at least one of evaluating expressions. For example, the expression extracting part 110 may extract a set of a noun "battery" indicating a evaluating item, a declinable word "long life" indicating an evaluation of "battery" and a case postpositional "ga" in Japanese (corresponding to "has" in this case) for associating "battery" and "long life" to make an evaluating expression "battery has long life".

The evaluating expression extracting device 30 also determines and decides the polarity for an evaluating expression formed by such a set. This enables the polarity determination to be performed with a fixed case even for a declinable word whose polarity varies in places and which can be used as favorable meaning and negative meaning. For example, this enables "big" to be determined as favorable (affirmative) in "big effect" and as unfavorable (negative) in "big noise".

In the above description, the polarity determining part 130 and the polarity deciding part 140 may determine/decide the polarity only for a declinable word and then determine/decide whether the polarity can be determined for a declinable word, whose polarity cannot be determined only by a declinable word, by considering the case in addition.

More specifically, when the polarity of a declinable word, which appears multiple places in a text, is determined for each of the places as the same with a predetermined ratio or more such as 90%, the polarity deciding part 140 decides the polarity of the declinable word to be the polarity that is determined as the same with the predetermined ratio or more. For example, as "light" on the list is determined positive for 90% or more, the polarity deciding part 140 decides the polarity of the declinable word positive. The polarity deciding part 140 may decide a polarity based on the condition that the declinable word appears predetermined number of times such as ten times in a text.

On the other hand, when the polarity of a declining word, which appears multiple places in a text, is not determined for each of the places as the same with a predetermined ratio or more, the polarity deciding part 140 directs the expression extracting part 110 to extract a new evaluating expression, which is a set of the declining word and nouns modifying the declining word. In response to the direction, the expression extracting part 110 extracts new evaluating expressions, for example, "for reference→be", "trouble→be" or "battery→long life". Next, the polarity determining part 130 determines the polarities of the new evaluating expressions. When the new evaluating expressions, which appear multiple places in a text, are determined to have the same polarity with a predetermined ratio such as 90% or more, the polarity deciding part 140 decides the polarity of the new evaluating expressions is the same as the polarity that is the same with a predetermined ratio or more. For example, as "for reference→be" and "battery→long life" on the list are determined to have the positive polarity for 90% or more, the polarity deciding part 140 decides them to have the positive polarity. As "trouble→is" is determined to have the negative polarity for 90% or more, the polarity deciding part 140 decides them to have the negative polarity. The polarity deciding part 140 may decide the polarity based on the condition that the declinable word appears predetermined number of times such as three times in a text. The number of times may be less than the lower limit for the declinable word to appear.

As a result of the above processing, the registered expression adding part 150 can register each of the evaluating expressions "for reference→be", "light", "trouble→be" and "battery→long life" in the registered expression storing part 100 as a registered expression.

FIG. 8 shows an example of registered expressions registered in the registered expression storing part 100 according to the embodiment of the present invention. After repeating the processing from S220 to S260, the evaluating expression extracting device 30 can record various registered expressions and the polarities of the registered expressions as shown in FIG. 8, for example, as well as registered expressions "satisfied" and "unsatisfied".

FIG. 9 shows an example of the evaluating expressions 90 outputted from the evaluating expression extracting device 30 according to the embodiment of the present invention. The evaluating expression extracting device 30 outputs each of the evaluating expressions in association with the statement number of the text, from which the evaluating expression is detected, the attribute of the text and the polarity determined for the evaluating expression. The evaluating expression extracting device 30 outputs information indicating whether the evaluating expression is joined to a registered expression by a conjunctive expression indicating a cause or a reason or not, in association with each of the evaluating expressions.

FIG. 10 shows a configuration of the preference expression detecting device 40 according to the embodiment of the present invention. The preference expression detecting device 40 has an attribute inputting part 400 and a preference expression detecting part 410. The attribute inputting part 400 inputs an attribute of a text that is designated as an object for detecting a preference expression. Specifically, the attribute inputting part 400 lets a user to input a keyword indicating a viewpoint for analyzing a preference expression as an attribute of a text that is designated as an object for detecting a preference expression.

The preference expression detecting part 410 detects evaluating expressions detected from a text with an attribute input by the attribute inputting part 400 from evaluating expressions extracted by the expression extracting part 110 of the evaluating expression extracting device 30, as a preference expression; and outputs the preference expression in association with the frequency of the preference expression being determined to have the positive polarity or the negative polarity in the text with the attribute. The frequency of a certain evaluating expression being determined to have the positive polarity in a text (or a group of texts) here refers to a ratio of the number of places, in which the evaluating expression is determined to have the positive polarity, to the number of places, in which the evaluating expression appears in the text. This is the same for negative polarity: The frequency that a certain evaluating expression is determined to have the negative polarity in a text refers to a ratio of the number of places, in which the evaluating expression is determined to have the negative polarity, to the number of places, in which the evaluating expression appears in the text.

FIG. 11 shows an example of preference expressions detected by the preference expression detecting device 40 according to the embodiment of the present invention. Specifically, FIG. 11 shows a preference expression indicating one's likes and dislikes for beer that is detected from a text, whose attribute indicating the residential area of the evaluator (subject) is Kanagawa prefecture and whose attribute indicating the sex of the evaluator is male. The preference expression detecting device 40 detects "bitter" as a preference expression and outputs the preference expression in association with the frequency of the preference expression being determined to have the positive polarity or the negative polarity or neutral/unproven. For example, according to FIG. 11, the preference expression "bitter" is determined to have the negative polarity for 5/8 of all the places it appears.

The preference expression detecting device 40 detects "thin" as a preference expression and outputs the preference expression in association with the frequency of the preference expression being determined to have the positive polarity or the negative polarity or neutral/unproven. For example, according to FIG. 11, the preference expression "thin" is determined neutral/unproven for 240/350 of all the places it appears. The preference expression 40 detects "is thin" as a preference expression and outputs the preference expression in association with the frequency of the preference expression being determined to have the positive polarity or the negative polarity or neutral/unproven. For example, according to FIG. 11, the preference expression "is thin" is determined to have the negative polarity for 60/130 of all the places it appears.

FIG. 12 shows an operational flow of the preference expression detecting device 40 according to the embodiment of the present invention. The attribute inputting part 400 inputs an attribute of a text, which is designated as an object for detecting preference expressions (S1200). The preference expression detecting part 410 selects evaluating expressions, which are detected from a text with an attribute input by the attribute inputting part 400, from evaluating expressions extracted by the expressing extracting part 110 (S1210). The preference expression detecting part 410 detects an evaluating expression, which appears the reference number of times or more (for example, five times or more) in texts, and whose frequency of being determined to have the positive polarity or the negative polarity varies among the places by a reference or more (for example, 75% or more), from the selected preference expressions as a preference expression (S1220).

The preference expression detecting part 410 further detects a preference expression from evaluating expressions, which appear less than a reference number of times or whose frequency of being determined to have the positive polarity or the negative polarity varies among the places by a reference value or less, based on the determination of the following processing from S1230 to S1250.

The preference expression detecting part 410 calculates the frequency of each of evaluating expressions commonly detected in a text with attributes, which has attributes input by the attribute inputting part 400, and a text without attributes, which does not have the attributes, being determined to have the positive polarity or the negative polarity in the text with attributes (1230). Next, the preference expression detecting part 410 calculates the frequency of the evaluating expression being determined to have the positive polarity or the negative polarity in a text with attributes. Then, the preference expression detecting part 410 detects the evaluating expression, whose frequency of being determined to have the positive polarity or the negative polarity varies between a text with attributes a text without attributes by a predetermined reference value or more, as a preference expression.

The preference expression detecting part 410 detects an evaluating expression, which is joined to an evaluating expression whose polarity is predetermined (for example, a registered expression) by a conjunctive expression indicating a cause or a reason, as a preference expression from evaluating expressions detected from the text with attributes input by the attribute inputting part 400 (S1240). The preference expression detecting part 410 determines whether or not the frequency of being determined to have the positive polarity or the negative polarity varies between that for a verbal phrase detected as an evaluating expression from a text with attributes input by the attribute inputting part 400, and that for a clause including the verbal phrase and other nominal phrase by a predetermined reference value or more (S1250). When the frequency varies by a reference value or more between that for the verbal phrase and that for the clause including the verbal phrase and other nominal clause, the preference expression detecting part 410 detects each of the verbal phrase and the clause as a preference expression.

FIG. 13 is a list for illustrating the processing of S1230 in FIG. 12. FIG. 13 shows the frequencies of an evaluating expression "bitter" and an evaluating expression "tastes thin" being determined to have the positive polarity. For example, the evaluating expression "bitter" is commonly detected from multiple texts, for which an attribute indicating the evaluator's age group varies. The evaluating expression "bitter" is determined to have the positive polarity with a frequency of 36% in the texts made by evaluators in 20s. This expression is determined to have the positive polarity with a frequency of 62% in the texts made by evaluators in 30s. The evaluating expression "tastes thin" is determined to have the positive polarity with a frequency of 5% in the texts made by evaluators in 20s, and with a frequency of 12% in the texts made by evaluators in 30s.

The preference expression detecting part 410 detects the evaluating expressions, whose frequency of being determined to have the positive polarity or the negative polarity varies by a reference value or more that is predetermined according to the difference between attributes of texts for detecting evaluating expressions, from the evaluating expressions commonly detected from texts with different attributes, as a preference expression. In other words, as the frequencies of the determination about the evaluating expression "bitter" varies by a reference value or more (for example, 20 points) among the evaluators' age groups, the evaluating expression "bitter" is detected as a preference expression even if the expression appears less than a reference number of times. On the other hand, as the frequencies of the determination about the evaluating expression "tastes thin" varies within a reference value (for example, 20 points) among some evaluators' age groups, the evaluating expression "is thin" is not detected as a preference expression.

The preference expression detecting part 410 detects the evaluating expressions, whose frequency of being determined to have the positive polarity or the negative polarity varies by a predetermined reference value or more for each of the evaluators' age groups, sexes or residential areas, from the evaluating expressions commonly detected from the text with at least one different attribute indicating evaluators' age groups, sexes and residential areas, as a preference expression. This enables an expression, whose meaning varies with attributes such as age groups, to be appropriately detected as a preference expression.

As mentioned above, the attribute is not limited to the evaluators' age groups, sexes and residential areas. The attribute includes when the text was made, for example. In the case that an evaluating expression is commonly detected in texts with different attributes of when the text was made and if the frequency of the evaluating expression being determined to have the positive polarity or the negative polarity varies by a reference value or more for each time the text, which is an object for detecting, was made, the preference expression detecting part 410 may detect the evaluating expression as a preference expression.

More specifically, the preference expression detecting part 410 may detect the evaluating expression, whose frequency of being determined to have the positive polarity or the negative polarity increases by a reference value or more in a new text compared to a previous text, as a preference expression. This enables an expression, which comes into use now to indicate an evaluation, to be detected properly.

FIG. 14 illustrates the processing of S1240 in FIG. 12. The processing by the preference expression detecting part 410 to detect a preference expression will be described by taking the sentence of statement number 1 in FIG. 2 as an example. The sentence of statement number 1 includes an evaluating expression of an adjective "Umai (meaning "tastes good")" 610, a conjunctive expression indicating a cause or a reason, "Node (meaning "as")" 600 and an evaluating expression of an adjective "Nigai (meaning "bitter")" 620. The evaluating expression 610 is a predetermined registered expression with a positive polarity.

In this sentence, the expression extracting part 110 detects the evaluating expression 620 as an expression indicating an evaluation of the object "beer". As the evaluating expression 620 is joined to the evaluating expression 610 with a positive polarity by the conjunctive expression 600, which is a non-adversative conjunctive expression, the polarity determining part 130 determines the evaluating expression 620 to have the positive polarity. The evaluating expression extracting device 30 determines that the evaluating expression 620 is joined to a registered expression by a conjunctive expression indicating a cause or a reason, and informs the preference expression detecting device 40 of that.

In response, the preference expression detecting part 410 determines that the evaluating expression 620 is joined to a registered expression by a conjunctive expression indicating a cause or a reason. This enables the preference expression detecting part 410 to recognize that the evaluating expression 620 is highly possible to indicate preference (likes and dislikes) even if the evaluating expression 620 appears less than a reference number of times and detect the evaluating expression 620 as a preference expression.

FIG. 15 is a list for illustrating the processing of S1250 in FIG. 12. The list (a) shows the case that an evaluating expression is not detected as a preference expression, and (b) shows the case that an evaluating expression is detected as a preference expression. In the list (a), the clause including a nominal phrase "tea" and a verbal phrase "is strong" is determined to have the positive polarity for 40 times, the negative polarity for 10 times, and determined neither of them for 50 times. In Japanese, a verbal phrase includes a set of an adverbial phrase and a postpositional.

On the other hand, the verbal phrase "is strong" is determined to have the positive polarity for 80 times, the negative polarity for 20 times, and determined neither of them for 100 times. When the clause including the nominal phrase "tea" and a verbal phrase "is strong" is compared with the verbal phrase "is strong" in the list (a) for the frequency of being determined to have the positive polarity, the frequency is 40% for both of them.

In contrast, in the list (b), the clause including the nominal phrase "tea" and the verbal phrase "is strong" is determined to have the positive polarity for 50 times, the negative polarity for 10 times, and determined neither of them for 40 times. The verbal phrase "is strong" is determined to have the positive polarity for 80 times, the negative polarity for 20 times, and determined neither of them for 100 times.

In this embodiment, when the clause including the nominal phrase "tea" and a verbal phrase "is strong" is compared with the verbal phrase "is strong" for the frequency of being determined to have the positive polarity, the frequencies are different; 50% and 40%, respectively. In such a case, the verbal phrase "is strong" tends to indicate the evaluator's preference (likes and dislikes) only when the verbal phrase "is strong" is joined to the nominal phrase "tea". Therefore, when the frequency of being determined to have the positive polarity or the negative polarity differs by a predetermined reference value or more between a verbal phrase detected as an evaluating expression and a clause including a nominal phrase with the verbal phrase and the verbal phrase, the preference expression detecting part 410 detects the verbal phrase as a preference expression and also detects the clause including the verbal phrase as a preference expression. This enables a verbal phrase, whose polarity is liable to change depending on its conjunctive relationship with a nominal phrase to join, to be detected as an expression indicating preference of an object.

FIG. 16 shows a specific example of a preference expression actually detected by the expression detecting system 10 according to the embodiment of the present invention.

FIG. 16 shows the frequency of an evaluating expression, which is actually extracted from a bulletin board on digital camera, being determined to have the positive polarity or the negative polarity. In the examples shown in FIG. 16, statements in the bulletin board are considered as text, each piece of which is associated with an attribute indicating when the text was made.

The evaluating expression "quick auto-focus" is determined to have the positive polarity with a frequency of 100% for the last one year. This expression does not appear or is not determined to have the positive polarity for the past two years from three years ago to the last year. This tells that more and more digital camera users are getting to like quicker auto-focus.

The evaluating expression "out of focus" is determined to have the negative polarity with a frequency of 100% for the past two years from three years ago to the last year. This expression does not appear or is not determined to have the negative polarity for the last one year. This tells that users are getting satisfied with focus. This example in combination with the abovementioned example tells that digital cameras are getting to be differentiated more in the auto-focus speed than in the auto-focus accuracy.

The evaluating expressions "software is excellent" and "retouch technique is difficult" are not appear from three years ago to the last year but are determined to have the positive polarity or the negative polarity for the last one year. This tells the recent tendency that not only basic performance of a digital camera but also additional values added by accessories count are regarded as important.

With the expression detecting system 10 according of the embodiment, person's preference can be analyzed by using a normal text data. For example, tendencies of preference of persons, who are the target of a specific product or a specific service, can be analyzed and features or varieties for each attribute such as a generation or a residential area can be recognized, based on information disclosed on the Internet by an individual or a community in the form of Blog (Weblog) or bulletin board or a written answer to a questionnaire.

FIG. 17 shows an exemplary hardware configuration of a computer 500 that functions as the preference expression detecting device 40. The computer 500 includes a CPU peripheral part having a CPU 1000, RAM 1020 and a graphic controller 1075, which are interconnected by a host controller 1082, an input/output part having a communication interface 1030, a hard disk drive 1040 and a CD-ROM drive 1060, which are connected to the host controller 1082 by an input/output controller 1084, and a legacy input/output part having ROM 1010, a flexible disk drive 1050 and an input/output chip 1070, which are connected to the input/output controller 1084.

The host controller 1082 connects the RAM 1020 with the CPU 1000 and the graphic controller 1075 which access the RAM 1020 at high transfer rate. The CPU 1000 operates based on programs stored in the ROM 1010 and the RAM 1020 and controls each part. The graphic controller 1075 obtains image data generated by the CPU 1000 or the like on a frame buffer provided in the RAM 1020 and causes a display device 1080 to display it. Alternatively, the graphic controller 1075 may contain a frame buffer to store image data generated by the CPU 1000 or the like.

The input/output controller 1084 connects the host controller 1082, the communication interface 1030, which is relatively fast input/output device, the hard disk drive 1040 and the CD-ROM drive 1060. The communication interface 1030 communicates with an outside device via a network. The hard disk drive 1040 stores a program or data to be used by the computer 500. The CD-ROM drive 1060 reads a program or data from a CD-ROM 1095 and provides it for the input/output chip 1070 via the RAM 1020.

To the input/output controller 1084, the ROM 1010, and a relatively slow input/output device such as the flexible disk drive 1050 and the input/output chip 1070 are connected. The ROM 1010 stores a boot program, which is performed by the CPU 1000 at starting up of the computer 500, or a program depending on hardware of the computer 500. The flexible disk drive 1050 reads a program or data from a flexible disk 1090 and provides it for the input/output chip 1070 via the RAM 1020. The input/output chip 1070 connects to various input/output devices via the flexible disk 1090, or, for example, a parallel port, a serial port, a keyboard, a mouse port, etc.

A user provides a program for the computer 500 on a storage medium including the flexible disk 1090, the CD-ROM 1095 and an IC card. The program is read out from a storage medium via the input/output chip 1070 and/or the input/output controller 1084 and installed and performed on the computer 500. The program read out from the storage medium may be provided for the evaluating expression extracting device 30 via a telecommunication line and performed on the evaluating expression extracting device 30. As the operations caused by the program for the computer 500 or the like to perform are the same as those performed by the evaluation expression extracting device 30 and the preference expression detecting device 40 described above with reference to FIGS. 1 to 16, description of the operations will be omitted.

The program shown above may be stored on an outside storage medium. Other than the flexible disk 1090 and the CD-ROM 1095, an optical storage medium such as a DVD or a PD, a magneto-optical storage medium such as an MD, a tape medium, semiconductor memory such as an IC card can be used as a storage medium. A storage device such as a hard disk or RAM provided for a server system connected to a private communication network or the Internet can be used as a storage medium so that a program can be provided for the computer 500 via the network.

Although the present invention has been described by using an embodiment, the technique of the present invention is not limited to the abovementioned embodiment. It is apparent for those skilled in the art that various modifications or improvements can be added to the abovementioned embodiment. It is apparent from the claims that embodiments added with such modifications or improvements are included in the technique of the present invention.

We claim:

1. An expression detecting system for detecting preference expressions indicating evaluators' likes and dislikes of a specific object from texts describing the evaluations of said specific object, comprising:

a text storing part for storing each of said texts describing the evaluations of a specific object in association with an attribute of the text;

an expression extracting part for extracting an evaluating expression describing evaluations of said specific object from each of said texts;

a polarity determining part for determining whether the evaluating expression extracted by said expression extracting part has a positive polarity or a negative polarity, wherein said positive polarity indicates a favorable evaluation of said specific object and said negative polarity indicates an unfavorable evaluation of said specific object;

an attribute inputting part for inputting an attribute of a text that is designated as an object for detecting said preference expressions; and a preference expression detecting part for detecting an evaluating expression, which is detected from a text having an attribute input by said attribute inputting part, from evaluating expressions extracted by said expression extracting part as a preference expression, and outputting the preference expressions in association with a frequency of the preference expressions being determined as a positive polarity or a negative polarity in the text having the attribute; said detecting said evaluating expression responsive to attributes including age group, sex or residential area from the evaluating expressions detected from the text; wherein said preference expression detecting part is implemented on a computer having a story memory; and a certainty factor storing part for storing certainty factor useful in determining polarity of an evaluating expression responsive to the certainty factor.

2. The expression detecting system according to claim 1, wherein said preference expression detecting part further detects an evaluating expression, whose frequency of being determined to have the positive polarity or the negative polarity differs by a predetermined reference value or more for each of a text with attributes, which has attributes inputted by said attribute inputting part, and a text without attributes, which does not have the attributes, from evaluating expressions commonly detected from said text with attributes and said text without attributes, as said preference expressions.

3. The expression detecting system according to claim 1, wherein said expression extracting part extracts a verb phrase, which indicates an evaluation of said specific object, and a set of a noun phrase and a verb phrase, which indicates an evaluation of said specific object, from each of said texts as evaluating expressions, which indicate evaluations of said specific object; and wherein said preference expression detecting part detects said verbal phrase, which is detected from a text with attributes inputted by said attribute inputting part as said evaluating expressions, as said preference expression, when the frequency of being determined to have the positive polarity or the negative polarity differs by a predetermined reference value or more for each of said verbal phrase and a clause including said verbal phrase and other nominal phrase, and also detects a clause including a nominal phrase with said verbal phrase and a verbal phrase as said preference expression.

4. The expression detecting system according to claim 1, wherein said expression extracting part further extracts a conjunctive expression, which is an expression indicating conjunctive relationship between said evaluating expressions; and wherein said preference expression detecting part detects an evaluating expression jointed by a conjunctive expression describing a cause or a reason, to an evaluating expression, which is predetermined to have the positive polarity or the negative polarity, among evaluating expressions, which are detected from a text with attributes inputted by said attribute inputting part, as said preference expression.

5. The expression detecting system according to claim 1, further comprising a registered expression storing part for registering an evaluating expression, whose polarity is predetermined, as a registered expression, wherein said positive polarity indicates favorable evaluation and said negative polarity indicates unfavorable evaluation;

wherein said expression extracting part further extracts a conjunctive expression, which is an expression indicating conjunctive relationship between said evaluating expressions;

and said system further comprising a registered expression detecting part for detecting said evaluating expression including said registered expression, which is registered in said registered expression storing part, from a plurality of said evaluating expressions;

wherein said polarity determining part determines that said evaluating expression, which is joined to said evaluating expression including said registered expression by a non-adversative conjunctive expression, and a series of said evaluating expressions, which are neither joined to said evaluating expression by either said non-adversative conjunctive expression or said adversative expression nor joined to each other by either said non-adversative conjunctive expression or said adversative expression, to have the same polarity as that of said registered expression.

6. The expression detecting system according to claim 5, further comprising
a registered expression adding part for storing an evaluating expression, which appears in multiple places in said texts, and which is determined to have the same polarity at a predetermined ratio or more of the number of places to all place of said texts with different attributes, in said registered expression storing part as said registered expression.

7. An expression detecting method for detecting preference expressions indicating evaluators' likes and dislikes of a specific object from texts describing evaluation of said specific object by means of a computer, wherein said computer has a text storing part for storing each of said texts describing evaluation of a specific object in association with an attribute of the text; comprising:

an expression extracting step of extracting an evaluating expression describing evaluation of said specific object from each of said texts;

a polarity determining step of determining whether the evaluating expression extracted by said expression extracting part has positive polarity or negative polarity, wherein said positive polarity indicates favorable evaluation of said specific object and said negative polarity indicates unfavorable evaluation of said specific object;

an attribute inputting step of inputting a text attribute that is designated as an object for detecting said preference expressions; and a preference expression detecting step of detecting an evaluating expression, which is detected from a text having an attribute input by said attribute inputting part, from evaluating expressions extracted by said expression extracting part as one of said preference expressions, and outputting the preference expressions in association with a frequency of the preference expressions being determined to have the positive polarity or the negative polarity in the text having the attribute; said detecting said evaluating expression being responsive to at least one predetermined reference value including the evaluators' age groups, sexes, residential areas, and times of creation of the texts; and said determining of the positive polarity or the negative polarity responsive to changes in trend in use of a phrase to indicate evaluators' likes and dislikes.

8. An expression detecting method for detecting preference expressions indicating evaluators' likes and dislikes of a specific object from texts describing evaluation of said specific object by means of a computer, wherein said computer has a text storing part for storing each of said texts describing evaluation of a specific object in association with an attribute of the text; comprising:

an expression extracting step of extracting an evaluating expression describing evaluation of said specific object from each of said texts using tendency of said evaluating expression to follow and to be followed by other evaluating expressions with the same polarity, and tendency of an adversative expression to appear between a favorable evaluating expression and an unfavorable evaluating expression;

a polarity determining part for determining whether the evaluating expression extracted by said expression extracting part has positive polarity or negative polarity, wherein said positive polarity indicates favorable evaluation of said specific object and said negative polarity indicates unfavorable evaluation of said specific object; and a preference expression detecting step of detecting an evaluating expression whose frequency of being determined to have the positive polarity or the negative polarity is equal to or more than a predetermined reference value defined for a difference between attributes of texts to be detected as a preference expression from evaluating expressions commonly detected in texts with different attributes.

9. A computer readable medium including a program for causing a computer to operate as an expression detecting system for detecting preference expressions indicating evaluators' likes and dislikes of a specific object from texts describing evaluation of said specific object, wherein execution of said program causes said computer to perform as:

a text storing part for storing each of said texts describing evaluation of a specific object in association with an attribute of the text;

an expression extracting part for extracting an evaluating expression describing evaluation of said specific object from each of said texts;

a polarity determining part for determining whether the evaluating expression extracted by said expression extracting part has positive polarity or negative polarity, wherein said positive polarity indicates favorable evaluation of said specific object and said negative polarity indicates unfavorable evaluation of said specific object;

a registered expression storing part for registering an evaluating expression, whose polarity is predetermined, as a registered expression, wherein said positive polarity indicates favorable evaluation and said negative polarity indicates unfavorable evaluation;

a registered expression deleting part for deleting a registered expression from said registered expression storing part if polarity of the evaluating expression is inconsistent with polarity of the registered expression;

an attribute inputting part for inputting a text attribute that is designated as an object for detecting said preference expressions; and a preference expression detecting part for detecting an evaluating expression, which is detected from a text having an attribute input by said attribute inputting part, from evaluating expressions extracted by said expression extracting part as one of said preference expressions, and outputting the preference expressions in association with a frequency of the preference expressions being determined to have the positive polarity or the negative polarity in the text having the attribute.

* * * * *